United States Patent
Engh-Halstvedt et al.

(10) Patent No.: US 10,650,577 B2
(45) Date of Patent: May 12, 2020

(54) GRAPHICS PROCESSING SYSTEMS

(71) Applicant: ARM Limited, Cambridge (GB)

(72) Inventors: Andreas Due Engh-Halstvedt, Trondheim (NO); Frank Langtind, Tiller (NO)

(73) Assignee: ARM LTD, Cambridge (GB)

( * ) Notice: Subject to any disclaimer, the term of this patent is extended or adjusted under 35 U.S.C. 154(b) by 0 days.

(21) Appl. No.: 15/246,970

(22) Filed: Aug. 25, 2016

(65) Prior Publication Data
US 2017/0061678 A1   Mar. 2, 2017

(30) Foreign Application Priority Data
Aug. 26, 2015   (GB) .................................. 1515146.7

(51) Int. Cl.
*G06T 15/40* (2011.01)
*G06T 15/00* (2011.01)

(52) U.S. Cl.
CPC ............ *G06T 15/40* (2013.01); *G06T 15/005* (2013.01)

(58) Field of Classification Search
CPC .......... G06T 15/40; G06T 15/005; G06T 1/20
See application file for complete search history.

(56) References Cited

U.S. PATENT DOCUMENTS

| | | | | |
|---|---|---|---|---|
| 5,898,437 A | * | 4/1999 | Deolaliker | ............. G06T 15/40 345/421 |
| 6,359,629 B1 | | 3/2002 | Hopcroft | |
| 2004/0246251 A1 | * | 12/2004 | Fenney | ................... G06T 11/40 345/426 |

FOREIGN PATENT DOCUMENTS

EP           0740272           10/1996

OTHER PUBLICATIONS

Sunday ("Areas of Triangles and Polygons", by Dan Sunday, published at http://geomalgorithms.com/a01-_area.html, archived as of Apr. 6, 2013 at http://www.archive.org) (Year: 2013).*
European Combined Search and Examination Report dated Jan. 18, 2016, GB Patent Application No. GB1515146.7.

* cited by examiner

*Primary Examiner* — William A Beutel
(74) *Attorney, Agent, or Firm* — Vierra Magen Marcus LLP

(57) ABSTRACT

A tile-based graphics processing pipeline includes a back-facing determination and culling unit that is operable to cull back-facing triangles before the tiling stage. The back-facing determination and culling unit include a triangle size estimator that estimates the size of a triangle being considered. If the size of the triangle is less than a selected size, then the area of the triangle is calculated using fixed point arithmetic and the result of that area calculation is used by a back-face culling unit to determine whether to cull the triangle or not. On the other hand, if the size estimator determines that the primitive is greater than the selected size, then the triangle bypasses the fixed point area calculation and back-face culling unit and is instead passed directly to the tiler.

17 Claims, 8 Drawing Sheets

GRAPHICS PROCESSING SYSTEMS

BACKGROUND

The technology described herein relates to graphics processing systems and in particular to mechanisms for culling primitives, e.g. prior to rasterisation, in a graphics processing pipeline.

Graphics processing is normally carried out by first splitting a scene (e.g. a 3-D model) to be displayed into a number of similar basic components or "primitives", which primitives are then subjected to the desired graphics processing operations. The graphics "primitives" are usually in the form of simple polygons, such as triangles.

The primitives for an output such as a frame to be displayed are usually generated by the applications program interface for the graphics processing system, using the graphics drawing instructions (requests) received from the application (e.g. game) that requires the graphics processing.

Each primitive is usually defined by and represented as a set of vertices. Each vertex for a primitive typically has associated with it a set of "attributes", i.e. a set of data values for the vertex. These attributes will typically include position data and other, non-position data (varyings), e.g. defining colour, light, normal, texture coordinates, etc., for the vertex in question.

For a given output, e.g. frame to be displayed, to be generated by the graphics processing system, there will typically be a set of vertices defined for the output in question. The primitives to be processed for the output will then be indicated as comprising given vertices in the set of vertices for the graphics processing output being generated. Typically, the overall output, e.g. frame to be generated, will be divided into smaller units of processing, referred to as "draw calls". Each draw call will have a respective set of vertices defined for it and a set of primitives that use those vertices.

Once primitives and their vertices have been generated and defined, they can be processed by the graphics processing system, in order to generate the desired graphics processing output (render target), such as a frame for display. This basically involves rasterising and rendering the primitives to generate the graphics processing output (using the vertex attributes associated with the vertices of the primitives that are being processed).

Some graphics processing units operate as "tile based" graphics processing pipelines, in which the two-dimensional graphics processing output or target (i.e. the output of the rendering process, such as an output frame to be displayed) is rendered as a plurality of smaller area sub-regions, usually referred to as "tiles". The tiles are each rendered separately (typically one after another). The rendered tiles are then combined to provide the complete rendering output (e.g. frame for display). In such arrangements, the render target (output) is typically divided (by area) into regularly-sized and shaped rendering tiles (they are usually e.g., squares or rectangles) but this is not essential.

Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques.

In tile-based graphics processing, the primitives to be processed for a given output (e.g. that make up the draw call currently being processed) are sorted into respective primitive lists (tile lists) that indicate for the tiles that the graphics processing output (render target) has been divided into for processing purposes, which primitives are to be processed for each tile. There may in this regard be a primitive list for each tile individually, or primitive lists that encompass multiple tiles may also or instead be provided. A given primitive may be included in more than one primitive list, e.g. where the primitive falls in more than one tile. The graphics processor and processing pipeline normally includes an appropriate tiler (tiling stage) that sorts the primitives into the respective primitive lists for this purpose.

The primitive lists are then used to determine which primitives should be rasterised and rendered when processing a given tile of the graphics processing output.

The primitive sorting (tiling) operation is normally carried out after the primitives for the render output have been "assembled" (i.e. after the vertices and the corresponding vertex connectivity information for the render output has been used to assemble the set of vertices for the render output into the required set of primitives), but before any rasterisation of the primitives.

It is accordingly advantageous to try to cull (discard) primitives from further processing at or before the tiling operation, so as to reduce the number of primitives that are sorted into the tile lists (and thus accordingly that are subsequently processed (at least rasterised)).

An example of such primitive culling is view frustum culling. In this case, it is determined whether a primitive falls completely outside the view frustum for the output that is being generated, and, if it does, the primitive is then discarded (and not sorted by the tiler into the tile lists). This then avoids primitives that fall completely outside the view frustum being processed by the tiler into tile lists (and processed further in the graphics processing pipeline).

The Applicants believe that there remains scope for improved primitive culling operations, particularly in the case of tile-based graphics processing units.

BRIEF DESCRIPTION OF THE DRAWINGS

A number of embodiments of the technology described herein will now be described by way of example only and with reference to the accompanying drawings, in which.

Like reference numerals are used for like features where appropriate in the drawings.

DETAILED DESCRIPTION

Figure 1:
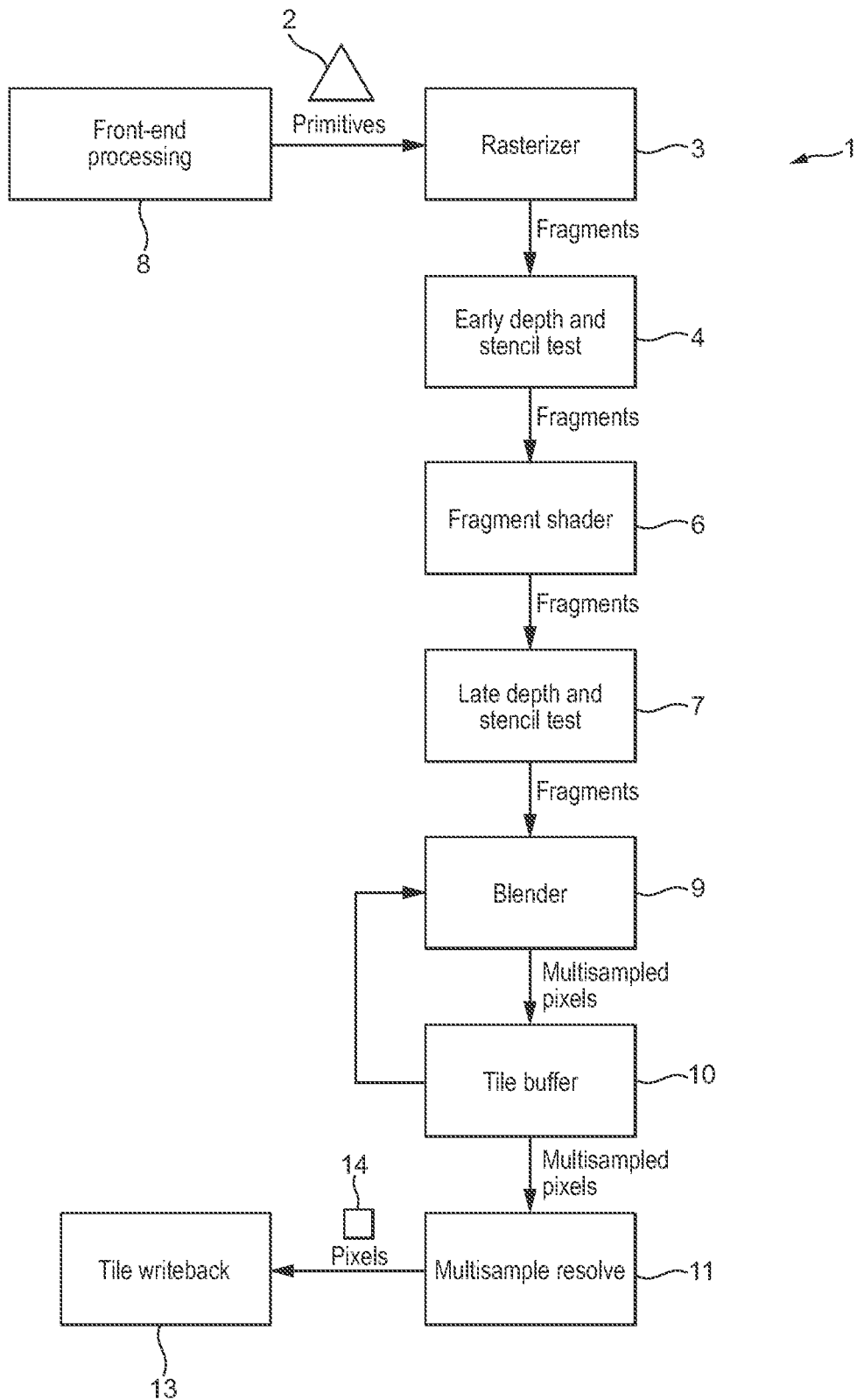
FIG. 1 shows an embodiment of a graphics processing pipeline that can be operated in accordance with the technology described herein.

A first embodiment of the technology described herein comprises a method of processing a graphics primitive in a graphics processing pipeline, the method comprising:

determining whether a property of the primitive meets a particular condition; and when the property of the primitive meets the particular condition:

determining the facing direction of the primitive using a particular processing operation or operations; and using the determined facing direction of the primitive to determine whether to cull the primitive from further processing; and when it is determined using the facing direction to cull the primitive from further processing, culling the primitive from further processing.

A second embodiment of the technology described herein comprises a graphics processing pipeline, the graphics processing pipeline comprising:

a testing stage operable to determine whether a property of the primitive meets a particular condition;

a facing direction determination stage operable to determine the facing direction of the primitive using a particular processing operation or operations; and a facing direction culling stage operable to:

use the determined facing direction of the primitive to determine whether to cull the primitive from further processing; and to when it is determined using the facing direction to cull the primitive from further processing, cull the primitive from further processing;

wherein:

the testing stage is operable to cause the facing direction determination stage to determine the facing direction of the primitive using the particular processing operation or operations in response to determining that the property of the primitive meets the particular condition.

The technology described herein relates to arrangements in which the facing direction of a graphics primitive to be processed is used to determine whether or not to cull the primitive from further processing. Graphics primitives to be processed will either be front-facing or back-facing (i.e. facing towards or away from the viewpoint). Primitives can be culled (discarded) based on their facing direction. Typically "back" facing primitives may be discarded, but front-facing primitives can be also or instead be discarded, if desired.

As will be discussed further below, the Applicants have recognised that culling primitives from processing based on their facing direction can advantageously be used, e.g., before the tiling process in a tile-based graphics processing pipeline to cull primitives prior to the tiling operation. This then further facilitates reducing the number of primitives that need to be processed by the tiler (and subsequently at least rasterised).

The Applicants have further recognised that it would be advantageous to treat primitives differently for the purpose of the facing direction determination based on their properties, such as and in an embodiment, based on the sizes of the primitives. As will be discussed further below, the Applicants have recognised that primitives can be classified into different groups for the purposes of the facing direction determination based on their properties, such as their size, and that, furthermore, by then performing the facing direction determination differently for each respective group of primitives, a more efficient system for determining the facing direction of primitives to be processed can be provided. This then has advantages in terms of power consumption, etc. when performing the facing direction determination for primitives to be processed, whilst still allowing for the efficient culling of primitives based on their facing direction.

Thus, in the technology described herein, primitives for which a particular property (e.g. their size) meets a given condition have their facing direction determined using a particular (e.g. selected, and in an embodiment predetermined) processing operation or operations.

The property of the primitive that is used to determine whether to determine the facing direction of the primitive using the particular processing operation or operations can be any suitable and desired property of the primitive that can be used to classify primitives for the purpose of performing facing direction determinations.

In an embodiment, the property of the primitive is the size of the primitive.

In an embodiment some form of indication or representation of the property, e.g. size, of the primitive is determined and then used to determine whether the property of the primitive meets the particular condition.

In an embodiment, the relevant property, such as the size, of the primitive is first estimated before determining whether the property meets the particular condition. Thus, in an embodiment, the method of the technology described herein comprises (and the pipeline comprises a stage (processing circuitry) operable to) determining an estimate and/or indication of the relevant property (e.g. and in an embodiment the size) of the primitive, and then determining whether the estimated property (e.g. size) of the primitive meets the particular condition.

The property of the primitive can be determined and estimated in any suitable and desired manner.

Where the property is the size of the primitive, then while it would be possible to use the area of the primitive as an estimate and indication of its size (and in one embodiment this is what is done), in an embodiment the size of the primitive is determined in terms of its extent in a given direction or directions. In an embodiment a measure of the effective "diameter" of the primitive is determined.

This could be done by, for example, estimating the extent of the primitive in a given direction or directions (for example along one or both of the coordinate axes), and/or by considering the extent of a side or sides of the primitive (such as the longest side of the primitive). Thus, for example, the maximum of the length and width (e.g. the maximum horizontal and/or vertical extent) of the primitive (e.g. in the x and y directions) could be used as an indication of and to estimate the size of the primitive. Additionally or alternatively, the sum of the extents of the primitive in given directions (e.g. along the x and y axes), and/or the sum of the lengths of the sides of the primitive could be used as an estimate of its size.

Using the extent of the primitive in a given direction or directions allows very long and thin primitives (that may accordingly only be large in one particular direction) to more readily be identified.

In an embodiment the coordinates of the vertices for the primitive are used to estimate the size (e.g. extent) of the primitive.

In this case, the coordinates of the vertices for the primitive could be used directly as an indication of (to estimate) the size of the primitive. For example, the magnitude of the coordinates could simply be used as an indication of (to estimate) the size of the primitive. This could be used, for example, to detect "huge" primitives that extend well outside the desired render output area (screen). For example, it could be determined whether the coordinates of one or more or all of the vertices of the primitive fall at or near or outside the edge of the area of the render output that is being generated (e.g. fall within or at the edge of or outside a guard region for the render output).

Alternatively or additionally, the primitive size (e.g. extent) could be, and in an embodiment is, estimated by performing some initial processing for the primitive, e.g. of the vertex coordinates for the primitive, with the result of that processing then being used as an indication of the size of the primitive.

In an embodiment, the difference(s) between respective coordinates of the vertices of the primitive are used to estimate and as an indication of the size of the primitive. This will then provide a measure of the extent of the primitive along each of the coordinate axes (x and y). The maximum difference value (i.e. the maximum extent in either x or y) for the primitive could then be used as indicating the size of the primitive, for example.

For example, where the facing direction determination operation includes determining the difference between the coordinates of respective vertices for the primitive (which may be the case where the facing direction determination operation includes determining a cross product using the coordinates of the vertices of the primitive), then the result of those comparison or difference determinations could be used as an indication of the size of the primitive for purpose of determining whether the primitive meets the particular condition or not.

Correspondingly, where the facing direction determination itself generates an estimate of the size of the primitive, then that size estimate could be used to determine how to classify the primitive for the purpose of the facing direction determination (for the remainder of the facing direction determination processing).

The particular condition that the property, e.g. size, of the primitive is considered against can be any suitable and desired condition for the property on which a selection of a processing operation to be used to determine the facing direction of the primitive can be based.

The condition is in an embodiment whether the particular property is greater than or less than a particular (threshold) value or values. For example, where the property of the primitive is the (estimated) size of the primitive, the condition is in an embodiment whether the size of the primitive is less than or less than or equal to (or greater than or greater than or equal to) a particular size measure. In an embodiment, if the (estimated) size of the primitive is smaller than a particular threshold size, then the determination of the primitive's facing direction is done using a particular, selected processing operation or operations. Thus in an embodiment the condition that the property that the primitive has to meet for it then to be determined for the facing direction of the primitive to then be determined using a particular processing operation or operations is whether the "size" of the primitive is less than or less than or equal to a threshold size measure.

Thus, in one embodiment, the primitive is considered to meet the condition for determining the primitive's facing direction using the particular processing operation or operations if one or more or all of the vertices of the primitive lie at or near the edge (e.g. and in an embodiment at the edge of or within a guard region) of the render output being generated. In an embodiment, the primitive is determined to meet the condition for the determination of the primitive's facing direction to be done using the particular processing operation or operations if the maximum difference between the coordinates of respective vertices of the primitive is less than or equal to a particular, in an embodiment selected, in an embodiment predetermined, threshold value.

The facing direction of the primitive can be determined in any suitable and desired manner. In an embodiment the facing direction is determined by determining the sign of the area of the primitive (as the sign of the area can indicate whether a primitive is front or back-facing (typically a "negative" area value will indicate that a primitive is back-facing)). Other arrangements would, of course, be possible, if desired.

The sign of the area of the primitive can be determined in any suitable and desired manner.

In an embodiment, the sign of the cross-product of the x/y coordinates of the vertices of the primitive is used to determine the sign of the area and hence the facing direction of the primitive. Thus, in an embodiment, where the primitive is a triangle having three vertices v0, v1 and v2, each having respective x and y coordinates, the area of the triangle (and hence the sign of the area that will indicate the triangle's facing direction) is determined as:

$$\text{Area}=((v1.x-v0.x)(v2.y-v0.y)-(v1.y-v0.y)(v2.x-v0.x)).$$

This expression gives the area of a parallelogram formed by two of the edges of the triangle (and hence will calculate a value that is twice the area of the triangle). However, as it is the sign of the area (or whether the area is exactly zero) that is of interest for the facing direction determination, then the fact that this expression does not calculate the exact area of the triangle can be ignored for the purpose of the facing direction determination (or could straightforwardly be corrected for, if desired).

An advantage of determining the sign of the area of a triangle in this way is that the expressions (v1.x−v0.x), etc., remove the absolute position of the vertices from the calculation (as they provide the differences between the vertex positions) and so even if the triangles' vertex coordinates themselves are very large numbers, the resulting difference values will depend solely upon the actual size of the triangle and so may be expressible as smaller numbers even if the actual coordinate values themselves cannot be. Also, as discussed above, these difference values can be used as an indication of the size of a primitive for the purpose of controlling the facing direction determination and culling operation.

These expressions also correspond to values used for, for example, generating bounding boxes when performing a tiling operation and when generating line equations representing the edges of a primitive, and so can be shared with and reused for other steps and stages of the graphics processing pipeline operations, if desired.

In an embodiment it is determined whether the primitive is back-facing. Correspondingly, in an embodiment, when it is determined that the primitive is back-facing, the primitive is culled from further processing. However, it would correspondingly be possible to cull front-facing primitives (or to cull both front and back-facing primitives, or to cull neither front-facing or back-facing primitives), if desired.

The particular processing operation that is used to determine the facing direction of the primitive when the property of the primitive meets the particular condition can be any suitable and desired processing operation for determining the facing direction of the primitive. In an embodiment it is a processing operation that can determine the facing direction of the primitive more efficiently and/or using less power. Thus in an embodiment, the facing direction of smaller primitives is determined using a processing operation that is more efficient and uses less power.

The vertex coordinates that are used for the vertices that are to be used for the render output will typically be provided in a given format from the vertex shading stage, such as in a given floating point format. The particular processing operation that is used to determine the facing direction of the primitive when the property of the primitive meets the condition is accordingly in an embodiment a processing operation that can determine the facing direction of the primitive more efficiently and/or using less power than would be the case if performing the necessary facing direction determination using the vertex coordinates in their initial, e.g. floating point format.

In one embodiment, the processing operation that is used to determine the facing direction of the primitive when the property of the primitive meets the particular condition is a processing operation that performs the relevant operations (calculations) using less range for the data values than would be required for the full calculation using the initially provided vertex coordinates.

Alternatively or additionally, the particular processing operation performs the necessary calculations using a different (alternative) (arithmetic) format to the format that the vertex coordinates are initially provided in (and would need to be processed in), such as, and in an embodiment, using a fixed point format and arithmetic rather than a floating point format and arithmetic.

Thus it would, for example, be possible, for the particular processing operation, to perform calculations using an alternative format but with the same range as for the initially supplied vertex data, or using the same format but less range than the initially supplied vertex data or using both an alternative format and less range than the initially provided vertex data, as desired.

In an embodiment, the particular processing operation that is used to determine the facing direction of the primitive when the property of the primitive meets the particular condition performs the calculation both in a different (alternative) format (such as, and in an embodiment, fixed point processing), and uses less range for the data values.

Correspondingly, in an embodiment, the particular processing operation that is used when the property of the primitive meets a particular condition comprises using arithmetic and data values of a particular, in an embodiment selected, in an embodiment predetermined, range (and format and number of bits). In this case, the numerical range that is used (supported) is in an embodiment a lower range than the range that is used (and supported) for the vertex coordinates for the primitive as they are initially comprised (e.g. and in an embodiment from the vertex shading operation to the primitive assembly operation).

In an embodiment, the particular processing operation that is used to determine the facing direction of the primitive when the property of the primitive meets the particular condition comprises determining the facing direction of the primitive using fixed point arithmetic, and in particular by using fixed point values for the coordinates of the primitive and in the facing direction determination. Using fixed point arithmetic and values for the facing direction determination means that that process can be carried out more efficiently and using less power (in a fixed point arithmetic logic unit) as compared, e.g., to performing the facing direction determination using floating point arithmetic and floating point values.

In an embodiment, the particular processing operation that is used to determine the facing direction of the primitive when the property of the primitive meets the particular condition comprises determining the facing direction of the primitive using less range for the data values (e.g. for the coordinates of the primitive) in the facing direction determination.

The Applicants have recognised in this regard that while using, e.g. fixed point arithmetic and values for the facing direction determination allows for that process to be carried out more efficiently than when, e.g., using floating point arithmetic and floating point values, it may not be desirable to use such fixed point processing for all primitives that may fall to be processed. Thus it is not effective simply to determine the facing direction of all primitives using, e.g. a given fixed point processing arrangement.

These embodiments address this by identifying those primitives for which performing the facing direction determination in a more efficient manner (e.g. using fixed point arithmetic) is appropriate by first considering a property, and in particular, and in an embodiment, the size, of the primitives, and then processing those primitives that have the appropriate properties (e.g. size) accordingly (e.g. using fixed point arithmetic and values). This then has the effect that those primitives for which more efficient processing using, e.g. fixed point arithmetic, would be suitable can be identified and processed in that manner, but those primitives for which such processing may not be so appropriate can also be identified and handled differently (and more appropriately).

Furthermore, the Applicants have recognised that in practice when generating render outputs, there will be sufficient primitives that are suitable for determining their facing direction in the more efficient manner (e.g. using fixed point arithmetic) (and that consequently can then be culled accordingly) so as to outweigh any additional processing and circuitry that may be required to classify the primitives based on their properties (e.g. size) for this purpose (and compared to, for example, simply providing a facing direction determination and culling stage (circuitry) that is able to handle all primitives that may fall to be processed identically).

In an embodiment, the particular processing operation that is used when the property of the primitive meets the particular condition comprises using fixed point arithmetic and fixed point values of a particular, in an embodiment selected, in an embodiment predetermined, precision and range (i.e. format and number of bits). In this case, the fixed point range that is used is in an embodiment a lower range than the range (whether fixed point or floating point) that the vertex coordinates for the primitive are initially provided in (e.g. and in an embodiment from the vertex shading operation to the primitive assembly operation).

Where the particular processing operation comprises performing the facing direction determination for the primitive using fixed point arithmetic and fixed point values, then the necessary values, e.g. vertex coordinates, in the fixed point format that is to be used can be generated in any suitable and desired manner. For example, the initial vertex coordinates that may, e.g., be expressed in a floating point format, could be converted appropriately to a fixed point format. Other arrangements would, of course, be possible.

Correspondingly, the conversion to the fixed point format can take place at and in any desired and suitable point and stage in the sequence of graphics processing pipeline operations and stages (so long as it is before the facing direction determination using the fixed point arithmetic and values is to take place). In an embodiment, the "fixed point" value generation takes place after the primitives have been assembled from the transformed vertices and vertex connectivity information, and, in an embodiment, before any size estimation for the purpose of the facing direction determination and culling operation.

Where the particular processing operation comprises performing the facing direction determination for the primitive using fixed point arithmetic and fixed point values, e.g. of a selected range, then in an embodiment the particular condition that the property of the primitive must meet is based on the (maximum) range of the fixed point arithmetic that the particular processing operation uses. Thus, in an embodiment, it is determined from the, e.g. size, of the primitive, whether the relevant data values (e.g. the vertex coordinates) for the primitive can be expressed using the fixed point data value range that the particular facing direction determination processing operation uses, and if those data values can be expressed using that fixed point value range, then the facing direction of the primitive is determined using the particular, fixed point, processing operation (but not otherwise).

The particular processing operation that is used to determine the facing direction of the primitive when the property of the primitive meets the particular condition could comprise and relate to the entire facing direction determination operation. In this case, the facing direction of the primitive would, e.g., be entirely determined using the fixed point arithmetic and fixed point values.

Additionally or alternatively, the particular processing operation that is used to determine the facing direction of the primitive when the property of the primitive meets the particular condition could relate to a particular part (e.g. some but not all) of the overall facing direction determination operation for the primitive. For example, an initial step or steps of the facing direction determination could be performed using a given form of processing operation (e.g. using floating point arithmetic and floating point values) with a later step or steps of the overall facing direction determination processing then being performed using the particular processing operation (e.g. using fixed point arithmetic and values) if the property of the primitive meets the required condition.

Thus, in an embodiment, the particular processing operation that is used to determine the facing direction of the primitive when the property of the primitive meets the particular condition comprises a processing operation that is used for part (but not all) of the overall facing direction determination for the primitive.

When the property of the primitive does not meet the particular condition for the particular processing operation to be used to determine the facing direction of the primitive, then the primitive can be, and is in an embodiment, treated (handled) in a different manner in relation to the facing direction determination.

In one embodiment, when the property of the primitive does not meet the particular condition, then the facing direction of the primitive is simply not determined (i.e. the primitive is not subject to any facing direction determination and culling), but instead the primitive is passed onwards to the next stage of the pipeline for processing (e.g., and in an embodiment, to the tiling stage).

Thus, in one embodiment, the testing stage is operable to, when it determines that the property of the primitive does not meet the particular condition, cause the processing of the primitive to omit (bypass) the facing direction determination stage, i.e. such that the primitive is not processed by the facing direction determination stage, but instead is in an embodiment processed by the next stage in the pipeline thereafter (e.g. and in an embodiment the tiling stage of the processing pipeline).

In an embodiment, when the property of the primitive does not meet the particular condition for the facing direction to be determined using the particular processing operation, the facing direction of the primitive is instead determined using another, different, processing operation or operations. In this case, there will, in effect, be two different processing operations that can be used to determine the facing direction of the primitive, and which of those processing operations to use for determining the facing direction of the primitive is then selected based on the property, e.g. size, of the primitive.

Thus, in an embodiment, the facing direction determination stage is operable to determine the facing direction of the primitive using at least two different processing operations (and in one embodiment it is operable to determine the facing direction of the primitive using two (and only two) different processing operations), and the testing stage is operable to cause a primitive to be processed by the facing direction determination stage of the pipeline using one of the processing operations based on the property (e.g. size) of the primitive that is being tested (and in particular based on whether that property meets the particular condition or not).

In these arrangements, the other processing operation that may be used to determine the facing direction of the primitive can be any suitable and desired processing operation that can determine the facing direction of the primitive. In an embodiment, it is a processing operation that is less efficient and/or will use more power or processing cycles than the processing operation that is used when the primitive meets the particular condition, such as using floating point arithmetic and values (e.g. where the processing operation that is used when the property, e.g. size, of the primitive meets the particular condition uses fixed point arithmetic and values).

It should also be noted here that because the particular processing operation for doing the facing direction determination for smaller primitives can mean that there may be better efficiency overall when considering all primitives that may need to be processed than if only a single mechanism for determining the facing direction of all the primitives to be considered was being used, then it would, if desired, be possible for the other processing operation that is used to determine the facing direction of the primitive when the property of the primitive does not meet the particular condition to be a processing operation that determines the facing direction of the primitive in a way that could be worse in some respects (e.g. in terms of performance) than might otherwise be the case, so as to instead, e.g., optimise for smaller area or lower power.

The other processing operation for determining the facing direction of the primitive could be a processing operation that uses fixed point arithmetic and fixed point values, but of a larger range than the processing operation that is used when the property, e.g. size, of the primitive meets the particular condition.

However, in an embodiment, the other processing operation, e.g. that is used to determine the facing direction of the primitive when the property of the primitive does not meet the particular condition determines the facing direction of the primitive using floating point arithmetic and floating point data values (e.g. for the coordinates of the vertices of the primitive).

Where the facing direction of the primitive is to be determined using floating point arithmetic and floating point data values, then again the facing direction of the primitive is in an embodiment determined by determining the sign of the area of the primitive (but with the area of the primitive being determined using floating point arithmetic and floating point data values).

The sign of the area of the primitive can be determined using floating point arithmetic and floating point data values in any suitable and desired manner. In an embodiment, a cross-product of the x/y coordinates of the vertices for the primitive (expressed as floating point values), modified by the signs of the w coordinates and the winding of the primitive, is used to determine the sign of the area and hence the facing direction of the primitive.

In an embodiment, one of the processing paths uses fixed point arithmetic and fixed point values for determining the facing direction of the primitive, and another of the processing paths uses floating point arithmetic and floating point values for determining the facing direction of the primitive, or bypasses any form of facing direction determination and culling for the primitive completely. In this arrangement, in an embodiment if the primitive is below a certain size, the fixed point processing path is used, but if the primitive is above a certain size, then the floating point or bypass path for the facing direction determination is used.

It would also be possible for there to be plural different property conditions, e.g., and in an embodiment, threshold size measures, that a primitive can be tested against, with each such condition having a corresponding associated processing operation for the facing direction determination. Thus, in this case, the primitives will be sorted into respective, e.g. size, ranges, with each respective primitive "size" range then having a corresponding associated processing path (operation) for the facing direction determination. Thus, there will, in effect, be respective ranges of the primitive property (e.g. size) that each have respective, different associated processing operations (paths) for the primitive facing direction determination.

For example, there could be two facing direction determination paths that each use fixed point arithmetic but with different (maximum) ranges (and, e.g. a further processing path that either omits the facing direction culling operation altogether or uses floating point arithmetic for the facing direction determination), with respective property (e.g. size) ranges for the primitive determining which of those different processing operations are used for the primitive in question.

Thus, in an embodiment, the graphics processing pipeline supports plural different processing paths for the determination of the facing direction of a primitive, and which of those processing paths to use for a primitive is determined based on a property, such as, and in an embodiment the size, of the primitive.

It would also be possible to have multiple points in the overall facing direction determination operation where a property, such as the size, of the primitive is used to determine or select the (e.g. form of the) next (or future) processing operation to be used for the primitive when determining its facing direction.

For example, a first such facing direction determination processing operation selection could be made based on the absolute magnitude of the vertex coordinates, to select either a floating point arithmetic processing path if the absolute magnitude of the vertex coordinates is above a threshold, or a fixed point subtraction if not, and then selecting one of two different fixed point processing paths based on the result of the subtraction.

The determination of the facing direction of the primitives and the (potential) culling of the primitives based on their facing direction in the manner of the technology described herein can be determined at any suitable and desired stage of the graphics processing pipeline operations, e.g., and in an embodiment, where it may be appropriate and desirable to try to cull primitives from further processing based on their facing direction.

In an embodiment, the graphics processing pipeline is a tile-based graphics processing pipeline, and the facing direction determination and culling in the manner of the technology described herein is performed before the tiling stage (the tiler) of the graphics processing pipeline operations, such that any primitives that are able to be culled on the basis of their facing direction are not processed by the tiling operation (are not sorted into primitive lists). This has the advantage of reducing the number of primitives that may be processed by the tiling operation.

Thus, in an embodiment, the operation to (potentially) cull primitives based on their facing direction in the manner of the technology described herein is performed after the primitive assembly stage of the graphics processing pipeline, but before any tiling stage (operation) of the graphics processing pipeline.

Correspondingly, the graphics processing pipeline in an embodiment further comprises a tiling stage operable to sort primitives to be processed into respective lists corresponding to particular regions of the graphics processing output (render output) to be generated, and the testing stage, facing direction determination stage and facing direction culling stage are all arranged before (and operate before) the tiling stage of the graphics processing pipeline.

Similarly, in an embodiment, the graphics processing pipeline includes a primitive assembly stage that generates a set of primitives to be processed from a set of vertices and vertex connectivity information for the graphics processing output (render output) to be generated, and the testing stage, facing direction determination stage and facing direction culling stage are arranged after (operate after) the primitive assembly stage (but in an embodiment before the tiling stage, if any).

The facing direction determination and culling stages (and operations) also in an embodiment take place before any rasterisation of the primitives (rasterisation stage of the graphics processing pipeline).

As well as the facing direction determination and culling operation of the technology described herein, the method of processing a graphics primitive and the graphics processing pipeline of the technology described herein can if desired, and in an embodiment does, include other primitive culling tests and culling operations. For example, the primitive could also be subjected to a view frustum culling operation, where it is determined whether the primitive falls within the view frustum or not. It could also be determined whether the primitive is so small that it will not be rasterised to any sampling positions at the rasterisation stage.

Thus, in an embodiment, the graphics processing pipeline further comprises at least one of, and in an embodiment all of, a view frustum culling stage that tests primitives to determine whether they are within the view frustum or not; and a small primitive culling stage that, tests primitives to determine whether they are so small that they will not in fact cover any sampling points when rasterised.

These additional primitive culling stages may be arranged before (and operate before) the facing direction determination stage and facing direction culling stage (and operations), such that only primitives that pass these other primitive culling operations and stages are then (potentially) subjected to the facing direction determination and culling operations.

In an embodiment, any view frustum primitive culling stage is arranged before (and operates before) the facing direction determination stage and facing direction culling stage (and operations), such that only primitives that pass the view frustum culling operation and stage are then (potentially) subjected to the facing direction determination and culling operations.

In an embodiment any small primitive culling stage is arranged after or in parallel with (i.e. operates in parallel with or after) the facing direction determination stage and facing direction culling stage (and operations) as it may share some calculations with the facing direction determination stage (and operation).

In an embodiment, the method of the technology described herein comprises, and the graphics processing pipeline of the technology described herein comprises, a further facing direction culling operation and stage that is in an embodiment performed before (in advance of) the facing direction determination and culling operation of the technology described herein described above. This further facing direction culling operation and stage in an embodiment compares the respective coordinates of the vertices for the primitive to determine whether those coordinates are greater than or less than or equal to each other, and then uses the results of those comparisons to determine whether a primitive can be culled or not based on its facing direction.

The Applicants have recognised in this regard that depending upon the results of the respective vertex coordinate comparisons (i.e. whether they are greater than or less than or equal to each other), then a primitive can, based on those vertex coordinate comparisons, be classified as being back-facing, front-facing, having zero area or as being "unknown" (i.e. its facing direction is undeterminable from the vertex coordinate comparisons). Thus for some primitives it is possible from a comparison of their vertex coordinates to determine whether they are front or back-facing, and accordingly to cull them (if desired) on that basis.

This additional facing direction determination and culling operation can be implemented as desired. In an embodiment, there is a look-up table that indicates for respective (and in an embodiment for each respective) combination of comparison results whether that indicates that the primitive is front or back-facing (and in an embodiment also if it has zero area) or not, so that the culling operation can be performed simply by performing a look-up into the look-up table.

This arrangement may be particularly advantageous for use in tile-based graphics processing pipelines that use bounding boxes when tiling the primitives (preparing the primitive lists), as the bounding box determination will typically require comparisons between respective pairs of vertices for a primitive to determine the edges of the bounding box. The results of those comparisons for the purpose of generating the bounding box can then correspondingly be used to index into the look-up table to identify (where that is possible) the facing direction of the primitive for the purposes of this initial facing direction culling operation and stage.

This initial facing direction culling stage is in an embodiment implemented and performed prior to the "main" facing direction determination and culling of the technology described herein. This then has the advantage that some primitives whose facing direction can more straightforwardly be determined can be culled at an even earlier stage, thereby reducing the number of primitives that are subjected to a more complex facing direction determination and culling operation.

In these arrangements, if the vertex coordinates are initially provided as floating point values, but may then be converted to corresponding fixed point values for the purposes of the main facing direction determination and culling operation of the technology described herein, then in an embodiment the comparisons of the vertex coordinates for this initial facing direction determination and culling operation are processed as floating point values, with only those primitives (and their vertices) that pass this initial facing direction determination and processing operation then being converted to corresponding fixed point values for the subsequent facing direction determination and processing operation.

It would also be possible to share processing results between the various different culling operations where it is appropriate to do that. For example, where terms that are used in some of the processing operations that are calculated could also be used in others of the processing (e.g. culling) operations, then the relevant terms can be saved and reused for multiple ones of the processing operations, if desired, rather than recalculating them.

If the primitive passes the back-facing determination and culling operation (or does not undergo (bypasses) that operation), it is in an embodiment then further processed, e.g. to generate relevant data to (potentially) display the primitive in the render output. This in an embodiment comprises rasterising and rendering (shading) the primitive.

In the case of a tile-based graphics processing pipeline, any primitive that passes (or that does not undergo) the back-facing determination and culling operation is in an embodiment subject to a tiling operation and included in an appropriate primitive list or lists. Then, once all the primitives of the graphics output to be generated have been sorted into their respective primitive lists, the respective tiles can be processed to generate the render output (by rasterising and rendering (shading) the primitives that have been included in primitive lists for the tiles.

Once a given primitive has been processed, the processed primitive data (e.g. sampling position values) can be written, e.g., to a buffer, as desired, with the data in the buffer then being written out, e.g., to a frame buffer in main memory once all the primitives to be considered have been processed.

Although the technology described herein has been described above with particular reference to the processing of a given primitive for a graphics output to be generated, as will be appreciated by those skilled in the art, the technology described herein can be and is in an embodiment repeated for plural primitives (and in an embodiment for each primitive) that fall to be processed for a given graphics output that is being generated. Correspondingly, the process may be repeated for successive graphics outputs to be generated, for example for a sequence of frames to be displayed.

The render output to be generated may comprise any render output that is to be generated by the graphics processing pipeline. Thus it may comprise, for example, a tile to be generated in a tile based graphics processing system, and/or a frame of output fragment data. The technology described herein can be used for all forms of output that a graphics processing pipeline may be used to generate, such as frames for display, render-to-texture outputs, etc. In an embodiment, the render output is an output frame.

The final output of the graphics processing can, e.g., be written, e.g. to a frame buffer, in main memory, from where it can then, e.g., be provided to a display for display, or otherwise processed.

Thus the graphics processing pipeline should (and in an embodiment does) produce some useful output data, e.g.

graphics processing output data for use in (subsequent) graphics processing operations etc. In an embodiment, the generated output data is used to provide an image for display, e.g. is provided to a display for display.

The technology described herein can be implemented in any desired and suitable graphics processing system and pipeline. However, in an embodiment, the graphics processing system and pipeline is a tile-based (tiling) graphics processing system and pipeline. In this case, the pipeline in an embodiment also comprises a tile buffer for storing tile sample values and/or a write out unit that operates to write the data in the tile buffer (e.g. once the data in the tile buffer is complete) out to external (main) memory (e.g. to a frame buffer).

The above describes the elements of the graphics processing pipeline that are involved in the operation in the manner of the technology described herein. As will be appreciated by those skilled in the art, the graphics processing pipeline can otherwise include, and in an embodiment does include, any one or one or more, and in an embodiment all, of the other processing stages that graphics processing pipelines normally include. Thus, for example, the graphics processing pipeline in an embodiment includes at least a rasteriser operable to rasterise graphics primitives that pass (or bypass) the facing direction culling operation to generate graphics fragments to be processed, and a renderer operable to process fragments generated by the rasteriser to generate rendered fragment data. In an embodiment the renderer is in the form of or includes a programmable fragment shader.

The graphics processing pipeline in an embodiment also includes one or more of, and in an embodiment all of: a vertex shading stage; a primitive assembly stage; a tiler (tiling stage); a primitive setup stage; a tile buffer or buffers for storing tile sample values and/or a write out unit that operates to write the data in the tile buffer (e.g. once the data in the tile buffer is complete) out to external (main) memory (e.g. to a frame buffer).

The graphics processing pipeline may also contain any other suitable and desired processing stages that a graphics processing pipeline may contain such as a depth (or depth and stencil) tester or testers, a blender, etc.

In an embodiment, the graphics processing pipeline comprises, and/or is in communication with, one or more memories and/or memory devices that store the data described herein, and/or that store software for performing the processes described herein. The graphics processing pipeline may also be in communication with the host microprocessor, and/or with a display for displaying images based on the output of the graphics processing pipeline.

Other arrangements would, of course, be possible.

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured microprocessor based system. In some embodiments, the technology described herein is implemented in computer and/or micro-processor based system.

The various functions of the technology described herein can be carried out in any desired and suitable manner. For example, the functions of the technology described herein can be implemented in hardware or software, as desired. Thus, for example, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry), that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages and units of the graphics processing pipeline may be embodied as processing stage circuitry, e.g. in the form of more fixed function units (hardware) processing circuitry, and/or in the form of programmable processing circuitry that can be programmed to perform the desired operation. Equally, any one or more of the processing stages and processing stage circuitry may be provided as a separate circuit element to any one or more of the other processing stages or processing stage circuitry, and/or any one or more or all of the processing stages and processing stage circuitry may be at least partially formed of shared processing circuitry.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said a data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

An embodiment of the technology described herein will now be described in the context of the processing of computer graphics for display.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output.

FIG. 1 shows schematically a graphics processing pipeline 1 that may operate in accordance with the technology described herein. The graphics processing pipeline 1 shown in FIG. 1 is a tile-based renderer and will thus produce tiles of a render output data array, such as an output frame to be generated. (As will be appreciated by those skilled in the art, other rendering arrangements can be used, if desired.)

In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.

The render output data array may typically be an output frame intended for display on a display device, such as a screen or printer, but may also, for example, comprise intermediate data intended for use in later rendering passes (also known as a "render to texture" output), etc.

FIG. 1 shows the main elements and pipeline stages of the graphics processing pipeline 1 that are relevant to the operation of the present embodiment. As will be appreciated by those skilled in the art there may be other elements of the graphics processing pipeline that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processing pipeline as shown in FIG. 1 may be implemented as desired and will accordingly comprise, e.g., appropriate circuitry and/or processing logic, etc., for performing the necessary operation and functions.

As shown in FIG. 1, the graphics processing pipeline 1 includes a number of stages, including a "front-end" processing stage 8, a rasterisation stage 3, an early Z (depth) and stencil test stage 4, a fragment shading stage 6, a late Z (depth) and stencil test stage 7, a blending stage 9, tile buffers 10 and a downsampling and writeback (multisample resolve) stage 11.

The front-end processing stage 8 performs a number of processing operations prior to the primitives for generating the render output being rasterised, including assembling the primitives for processing and preparing the primitive lists indicating which primitives should be processed for each tile that the render output has been divided into for processing purposes. This front-end processing will be described in more detail below with reference to FIGS. 2-8.

The rasterisation stage 3 of the graphics processing pipeline 1 operates to rasterise the primitives making up the render output (e.g. the image to be displayed) into individual graphics fragments for processing. To do this, the rasteriser 3 tests graphics primitives to be rendered against an array of sampling positions representing the render output to be generated to determine which sampling positions, if any, the primitive covers. It then generates graphics fragments having appropriate positions (representing appropriate sampling positions) for rendering the primitives.

The rasteriser 3 generates fragments to process each sampling position of the sampling positions that are being used to sample the render output that is covered by a primitive. These fragments are then sent onwards to the rest of the pipeline for processing.

The early Z/stencil stage 4 performs a Z (depth) test on fragments it receives from the rasteriser 3, to see if any fragments can be discarded (culled) at this stage. To do this, it compares the depth values of (associated with) fragments issuing from the rasteriser 3 with the depth values of fragments that have already been rendered (these depth values are stored in a depth (Z) buffer that is part of the tile buffers 10) to determine whether the new fragments will be occluded by fragments that have already been rendered (or not). At the same time, an early stencil test is carried out.

Fragments that pass the fragment early Z and stencil test stage 4 are then sent to the fragment shading (rendering) stage 6. The fragment shading stage 6 performs the appropriate fragment processing operations on the fragments that pass the early Z and stencil tests, so as to process the fragments to generate the appropriate fragment data, etc., for the render output (e.g. for display of the fragments), as is known in the art.

This fragment processing may include any suitable and desired fragment shading processes, such as executing fragment shader programs on the fragments, applying textures to the fragments, applying fogging or other operations to the fragments, etc., to generate the appropriate fragment data, as is known in the art. In the present embodiment, the fragment shading stage 6 is in the form of a programmable fragment shader, but other arrangements, such as the use also or instead of fixed function fragment shading units would be possible, if desired.

There is then a "late" fragment Z and stencil test stage 7, which carries out, inter alia, an end of pipeline depth test on the shaded fragments to determine whether a rendered fragment will actually be seen in the final output. This depth test uses the Z-buffer value for the fragment's position stored in the Z-buffer in the tile buffers 10 to determine whether the fragment data for the new fragments should replace the fragment data of the fragments that have already been rendered, by comparing the depth values of (associated with) fragments issuing from the fragment shading stage 6 with the depth values of fragments that have already been rendered (as stored in the depth buffer). This late fragment depth and stencil test stage 7 also carries out any necessary "late" alpha and/or stencil tests on the fragments.

The fragments that pass the late fragment test stage 7 are then subjected to, if required, any necessary blending operations with fragments already stored in the tile buffers 10 in the blender 9. Any other remaining operations necessary on the fragments, such as dither, etc. (not shown) are also carried out at this stage.

Finally, the (blended) output fragment data (values) are written to the tile buffers 10 from where they can, for example, be output to a frame buffer for display. The depth value for an output fragment is also written appropriately to a Z-buffer within the tile buffers 10. The tile buffers and Z-buffer store an appropriate colour, etc., or Z-value, respectively, for each sampling point that the buffers represent (in essence for each sampling point of a tile that is being processed).) The tile buffers thus store an array of fragment data that represents the part of the render output (e.g. image to be displayed) that is currently being processed.

In the present embodiment, three tile buffers are provided. Each tile buffer stores its fragment data in a 32×32 array (i.e. corresponding to a 32×32 array of sample positions in the output to be generated, e.g., in the image to be displayed). Each 32×32 data position tile buffer can accordingly correspond to a 16×16 pixel "tile" of, e.g., the frame to be displayed, at 4x anti-aliasing (i.e. when taking 4 samples per pixel).

These tile buffers may be provided as separate buffers, or may in fact all be part of the same, larger buffer. They are located on (local to) the graphics processing pipeline (chip).

In this embodiment, two of the three tile buffers are used to store colour (red, green, blue) values for each sampling point (it would be possible to use one tile buffer for this purpose, but in an embodiment two is used), and one tile buffer is used to store Z (depth) values and stencil values for each sampling point. Other arrangements would, of course, be possible.

The data from the tile buffers 10 is input to a downsampling (multisample resolve) unit 11, and thence output (written back) to an output buffer 13 (that may not be on the graphics processing platform itself), such as a frame buffer of a display device (not shown). (The display device could comprise, e.g., a display comprising an array of pixels, such as a computer monitor or a printer.)

The downsampling unit 11 downsamples the fragment data stored in the tile buffers 10 to the appropriate resolution for the output buffer (device) (i.e. such that an array of pixel data corresponding to the pixels of the output device is generated), to generate output values (pixels) 14 for output to the output buffer 13.

The downsampling unit 11 in the graphics processing pipeline 1 in the present embodiment is configured to be able to in one downsampling operation (clock cycle) downsample four sample position values from the tile buffer 10 to a single output value, e.g. 14 for output to the output buffer 13.

This downsampling can take place in any suitable manner. In the present embodiment linear blending of the data is used to downsample it. However, other arrangements would be possible, if desired. If needed, the downsampling unit 11 may also apply appropriate gamma correction to the data that it outputs to the output buffer 13, or this may be done, e.g., as a fragment shading operation, or in any other suitable and desired manner.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed).

Other arrangements for the graphics processing pipeline 1 would, of course, be possible.

Figure 2:
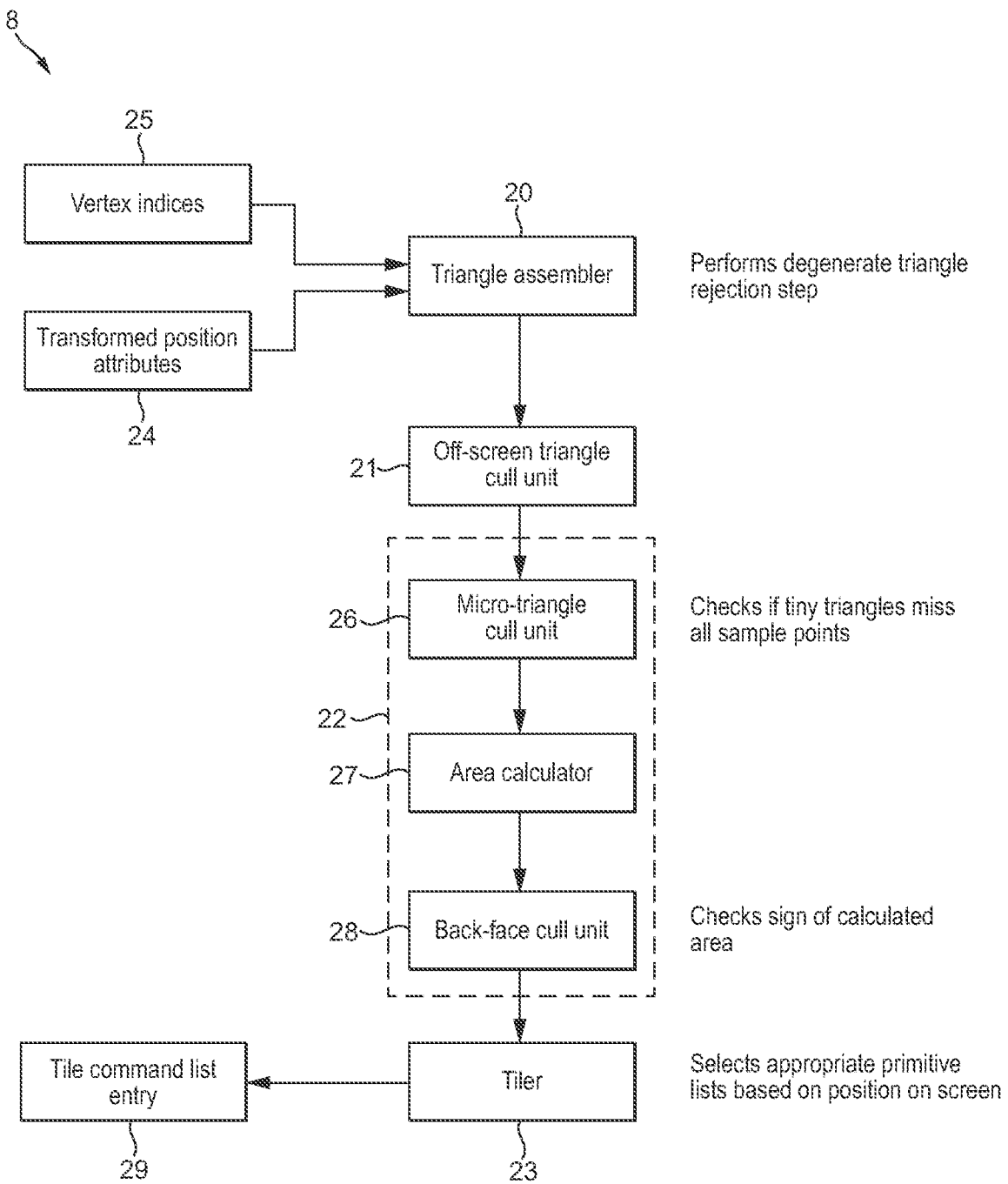
FIG. 2 shows the front-end processing operation of the graphics processing pipeline of FIG. 1 in more detail.

FIG. 2 shows the front-end processing 8 of the graphics processing pipeline 1 shown in FIG. 1 in more detail.

As shown in FIG. 2, the front-end processing 8 in the embodiments of the technology described herein includes a triangle assembler (assembly stage) 20, an off-screen triangle cull unit (stage) 21, a triangle back-facing determination and cull unit (stage) 22 and a tiler (a tiling unit stage) 23. (In the present embodiments, it is assumed that the primitives to be processed are in the form of triangles. However, other forms of primitive could be used if desired (and would be treated in a corresponding manner to the triangles shown in the present embodiments).)

The triangle assembler 20 converts the set or stream of vertices for the render output to be generated into the desired sequence and set of primitives to be processed to generate the render output. To do this it uses appropriately transformed position attributes 24 for the set of vertices that are to be used to generate the render output together with connectivity information 25 (e.g. in the form of vertex indices) provided by the application program interface for the graphics processing pipeline that defines how the vertices should be combined to form the primitives (triangles) that are to be rendered.

The transformed position attributes 24 may be provided, e.g., from a vertex shading stage (not shown) that performs vertex shading operations on the initial vertex attributes that are provided so as to, e.g., provide appropriately transformed vertices.

The triangle assembler 20 may also reject degenerate triangles (e.g. triangles for which two or more of the vertices are at the same position), if desired.

The off-screen triangle cull unit 21 receives the triangles assembled by the triangle assembler 20 and determines if they lie completely outside the defined boundary for the render output to be generated or not. If a triangle lies completely outside the relevant rendering boundary, then it is culled.

The back-face determination and culling unit 22 operates to determine whether primitives (triangles) are back-facing or not, and to cull back-facing primitives from further processing. A number of embodiments for performing this operation that are in accordance with the technology described herein will be described in more detail below with reference to FIGS. 3-8.

As shown in FIG. 2, the back-face determination and culling unit 22 comprises, inter alia, a "micro-triangle" cull unit 26, a triangle area calculator 27 and a back-face cull unit 28.

The micro-triangle cull unit 26 operates to discard any triangles that are so small that they will miss all the sampling points that are being used to generate the render output. To do this, it determines and uses line equations for the edges of the triangles to check if a triangle misses all the sampling points that will be considered during the rasterisation process. If a triangle will miss all the sample points, then the triangle is too small and so is culled.

The area calculator 27 determines the sign of the area of any triangles that pass the micro-triangle cull unit 26.

The back-face culling unit 28 uses the sign of the area for the triangle calculated by the area calculator 27 to identify and cull any back-facing primitives (triangles).

Although the present embodiments show the micro-triangle cull unit as operating before the area calculator 27 and the back-face culling unit 28, in other embodiments the micro-triangle cull unit 26 may operate after or in parallel to the area calculator 27 and back-face culling unit 28. Indeed, this may be desirable, as it may share some calculations with those units.

Any primitives (triangles) that pass the back-face culling stage 22 are then provided to the tiler 23 which operates to identify which tiles of the render output a primitive should be processed for (based on the position of the primitive within the render output), and adds an appropriate command indicating that the primitive in question should be processed to the relevant primitive lists 29 for the tiles in question.

The tiler (tiling stage) 23 can operate to sort the primitive into tiles in any suitable and desired manner. In an embodiment, a bounding box is generated for each triangle that is being considered and then tested against the render output to determine the render output area (and thus the tile or tiles) that the primitive (potentially) falls within. Tiling arrangements other than bounding box binning, such as exact binning, could also or instead be used, if desired.

FIGS. 3-8 show schematically three embodiments for the operation of the front-end processing shown in FIG. 2 that are in accordance with the technology described herein.

Figure 3:
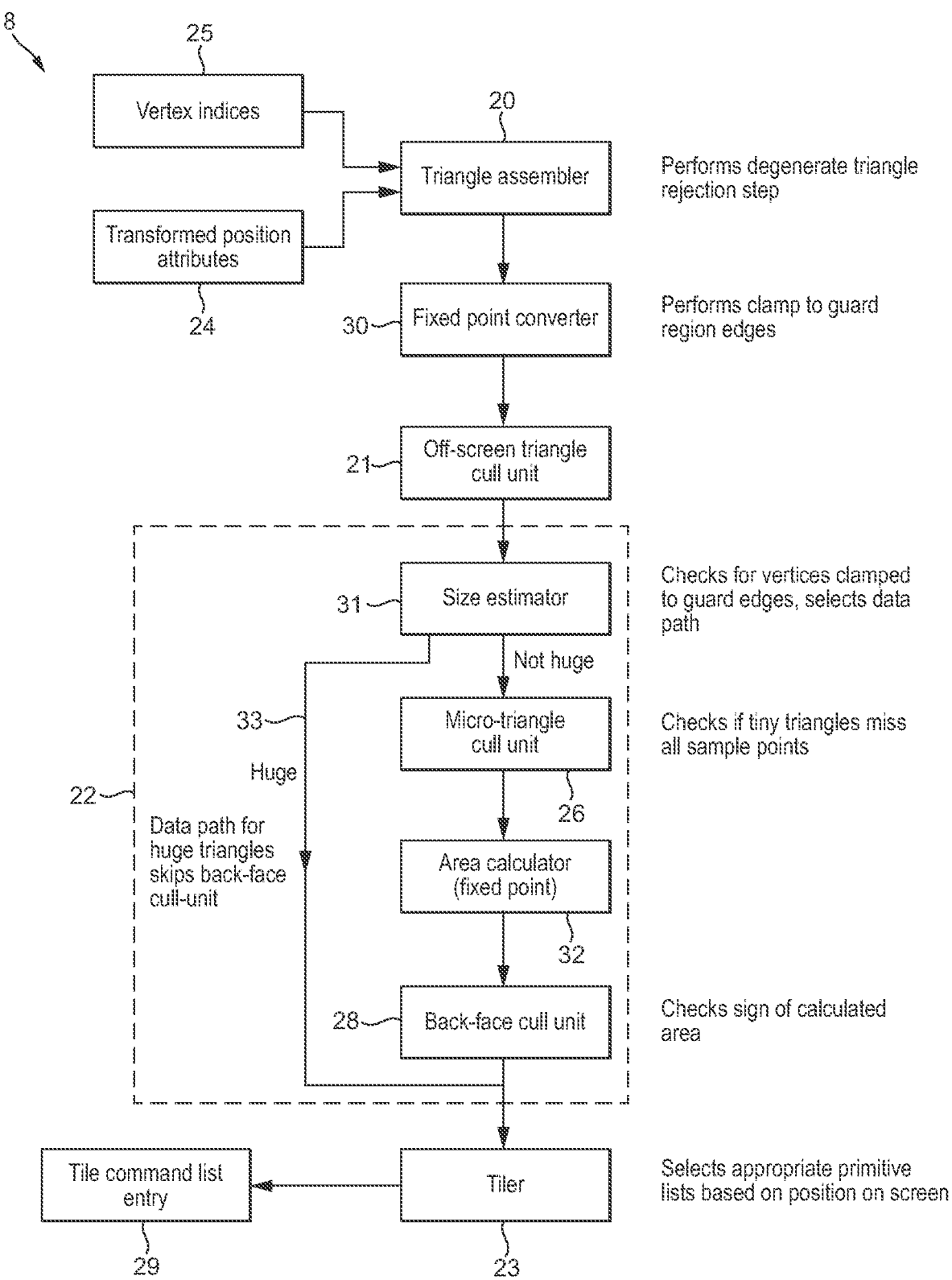
FIGS. 3 and 4 show a first embodiment of the front-end processing operation of the graphics processing pipeline of FIG. 1 that is in accordance with the technology described herein.
Figure 4:
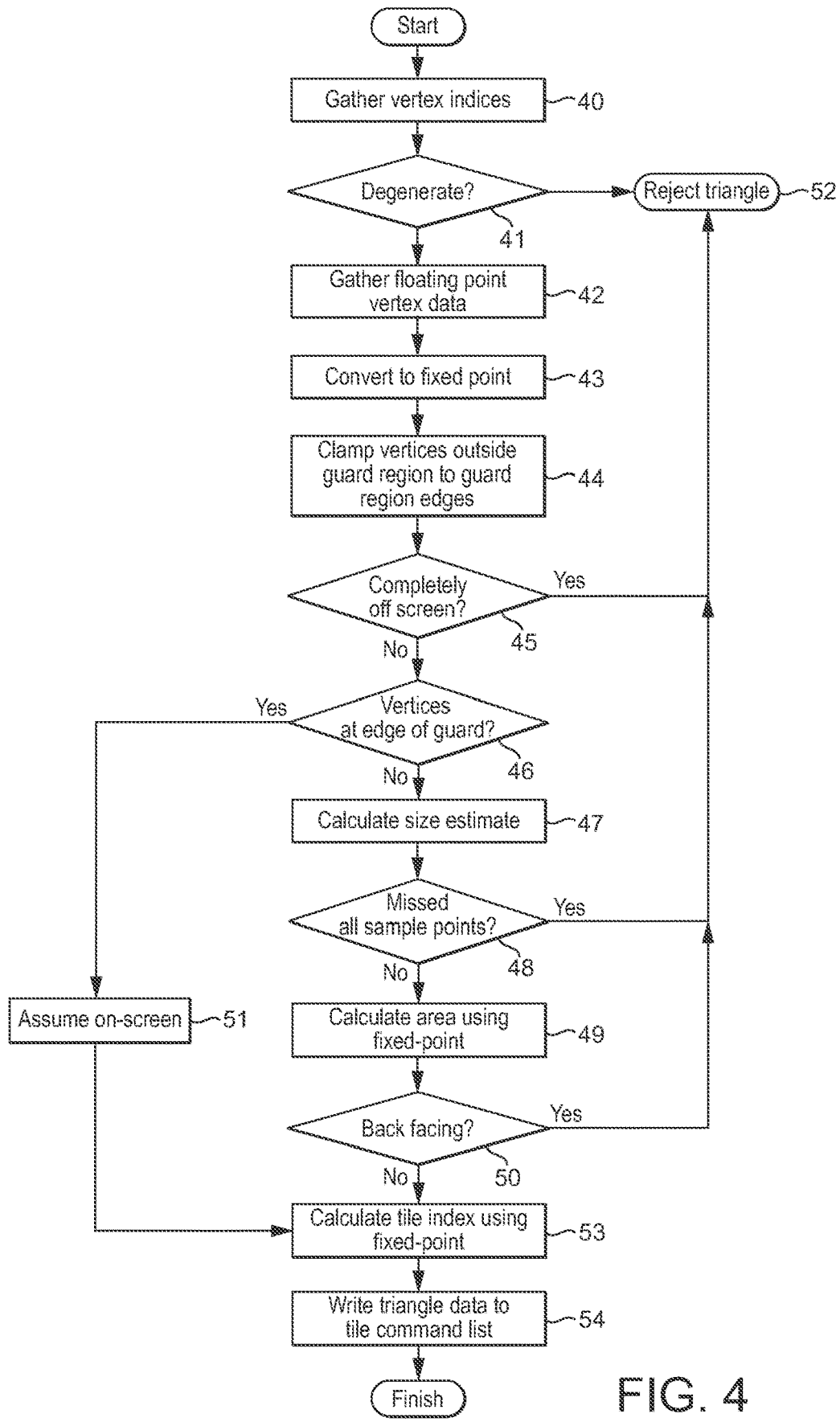

FIGS. 3 and 4 show a first embodiment, in which triangles (primitives) that are above a certain size are not subject to any back-face culling area calculation or culling test, but smaller triangles are subjected to a more compact area calculation and back-face culling test that, in particular, uses fixed point processing and data values of a selected range.

FIG. 3 shows the processing stages and units and FIG. 4 is a corresponding flowchart showing the front-end processing operation in this embodiment of the technology described herein.

As can be seen, FIG. 3 shows in more detail the stages and units of the front-end processing shown in FIG. 2.

As shown in FIG. 3, following the triangle assembly stage 20, in the present embodiment the triangle vertex coordinates which will have been provided to the graphics processing pipeline and processed in the, e.g. vertex shading stage, in a floating point format, are first converted to a set of corresponding coordinates in a fixed point format using a fixed point converter 30.

The fixed point converter 30 also operates to clamp (set) any coordinates that fall outside the edges of a guard region around the output to be processed to values that lie on the guard region edges.

The floating point triangle vertex coordinates can be converted to a fixed point format in any suitable and desired manner. In the present embodiment, the fixed point format is in an embodiment able to represent a grid of sampling positions having a defined maximum coordinate value range and minimum precision, such that the fixed point coordinates will have a fully defined maximum value, and a defined minimum precision (such as 1/256th of a pixel). This may be particularly appropriate where, for example, the originally provided floating point coordinate values are equally constrained to be snapped to such a grid of sampling positions.

The actual fixed point format that is used for the triangle vertex coordinates can be selected as desired, e.g. in accordance with the maximum range and precision of the coordinate values that is to be used. This may be, and in an embodiment is, based on the maximum supported output (e.g. screen) size of the overall data processing system that the graphics processing pipeline is part of. For example, for a maximum supported screen size of 16 k×16 k pixels, with a 1/256th pixel minimum precision, a suitable fixed point format would be a signed 16:8 fixed point format. Other arrangements would, of course, be possible.

The so-converted primitives are then subject to off-screen culling in the off-screen cull unit (stage) 21. This unit may determine whether the primitives are off-screen or not in any suitable and desired manner. For example, it may determine if all three vertices are on the non-visible side of the same screen edge (e.g. all x<0, or all y>screen height). It could also or instead perform view frustum culling if desired.

Any triangles that are not culled for being off-screen, are then provided, as shown in FIG. 3 (and correspondingly to FIG. 2) to the back-facing determination and culling unit 22.

As a first stage of the back-facing determination and culling operation, the size (area) of the triangle is estimated by a size estimator 31.

In the present embodiment, the size estimator 31 estimates the area of the triangle by determining whether any of the vertices for the triangle lie on the guard region edge. (If any one of the vertices for the triangle has been clamped to the guard region edge, then either the primitive is huge and would require, e.g., a full floating point calculation to determine its visibility (if desired), or it is small and completely off one side of the screen (in which case it may already have been trivially rejected, but if not, can be rejected at this point).)

If the size estimator 31 determines that the vertices for the triangle do not lie on the guard region edge, then the triangle is determined to be small enough to be subjected to a back-face culling operation and so the triangle is passed to the micro-triangle cull unit 26 for testing.

If the triangle is not culled by the micro-triangle cull unit (stage) 26, it is passed to an area calculator 32, and then to the back-face culling unit 28.

In this embodiment, the area calculator 32 is configured to use the fixed point values for the primitive vertices to determine the sign of the triangle's area, and so is able to perform the area calculation for the triangle in a relatively efficient manner.

In this embodiment, the area calculator 32 determines the sign of the area of a triangle having three vertices v0, v1 and v2, each having respective x and y coordinates, as:

Area=((v1.x−v0.x)(v2.y−v0.y)−(v1.y−v0.y)(v2.x−v0.x))

with the vertex coordinates v1.x, v0.x, etc., being the appropriate fixed point format values for those coordinates.

This expression gives the area of a parallelogram formed by two of the edges of the triangle (and hence will calculate a value that is twice the area of the triangle). However, as it is the sign of the area (or whether the area is exactly zero) that is of interest for the facing direction determination, then the fact that this expression does not calculate the exact area of the triangle can be ignored for the purpose of the facing direction determination (or can straightforwardly be corrected for, if desired).

The area calculator 32 may, and in an embodiment does, comprise a fixed point arithmetic logic unit that can perform the subtractions and multiplications necessary for the area calculation.

The back-face cull unit 28 then uses the sign of the area of the triangle calculated by the area calculator 32 to determine whether the triangle is back-facing or not. If it determines that the triangle is back-facing, it then culls the triangle.

If the triangle passes the back-face culling determination, it is then passed to the tiler 23 for tiling.

As shown in FIG. 3, if the size estimator 31 determines that a triangle is too large to be subjected to the back-face culling operation, then the triangle is simply sent directly 33 to the tiler 23, i.e. the micro-triangle culling 26, area calculation 32 and back-face culling 28 operations are omitted (skipped) for that triangle.

The Applicants have recognised in this regard that for smaller triangles it is possible to determine their area and perform the back-face culling operation using fixed point arithmetic and data values, which thereby allows that processing to be carried out in a relatively efficient manner. However, the Applicants have further recognised that using fixed point arithmetic and values for the triangle area calculation and back-face culling operation may not be suitable for all triangles that may fall to be rendered, and in particular, that such an arrangement may not be suitable for use when processing very large triangles.

The technology described herein addresses this by using the size estimator 31 to classify triangles to be processed according to their size, and then bypassing (skipping) the fixed point arithmetic back-facing determination and culling operation for very large triangles that that operation would not be suitable for (but any smaller triangles where it would be effective to perform the fixed point back-facing determination and culling are subjected to the back-facing determination and culling operation.)

In this way, back-face culling can be carried out in a relatively efficient manner prior to the tiling operation 23, and without needing to provide, for example, support for performing the back-facing determination and culling for all cases of triangle, and in particular for large triangles that may not be able to be satisfactorily processed in that manner.

FIG. 4 is a flowchart showing the sequence of operations for the front-end processing pipeline arrangement shown in FIG. 3.

As shown in FIG. 4, the front-end processing starts with the triangle assembler 20 gathering the vertex indices to assemble the triangle being processed (step 40). It is then determined whether the triangle is degenerate (step 41). If the triangle is determined to be degenerate, then the triangle is rejected (step 52).

On the other hand, if the triangle is determined not to be degenerate, then the floating point vertex data for the triangle is fetched (step 42) and converted to corresponding fixed point values (step 43).

Any vertices that fall outside the guard region are then clamped to the guard region edges (step 44).

It is then determined whether the triangle is completely off-screen (step 45). If the triangle is determined to be completed off-screen, then it is rejected (step 52).

If at step 45 the triangle is determined not to be completely off-screen, it is then determined whether any of the vertices for the triangle are at the edge of the guard region (step 46).

If all the vertices are determined to be at the edge of the guard region, then the triangle is determined to be "large", and so assumed to be on-screen (step 51) and thus provided directly to the tiling operation (step 53) (i.e. the back-facing determination and culling steps 47-50 are bypassed (skipped)).

If it is determined that the vertices of the triangle are not all at the edge of the guard region at step 46, then the triangle is classified as being "small" (i.e. its size is determined as being suitable for performing the fixed point back-facing determination and culling operation), and so a size estimate for the triangle is determined at step 47.

It is then determined at step 48 whether the triangle is sufficiently small so as to miss all the sampling points (and if so the triangle is rejected (step 52)). If the triangle is not so small as to miss all the sampling points, then the sign of the area of the triangle is calculated using fixed point arithmetic and the fixed point coordinate values that the vertices have been converted to (step 49).

It is then determined using the sign of the area calculated at step 49 whether the triangle is back-facing or not (step 50).

If the triangle is back-facing, then it is rejected (step 52), but if it is not back-facing, then it is subject to the tiling operation (step 53) and the appropriate triangle data is written into the appropriate tile lists (step 54).

The next triangle can then be processed in a similar manner, and so on, until all the triangles to be considered have been processed.

Figure 5:
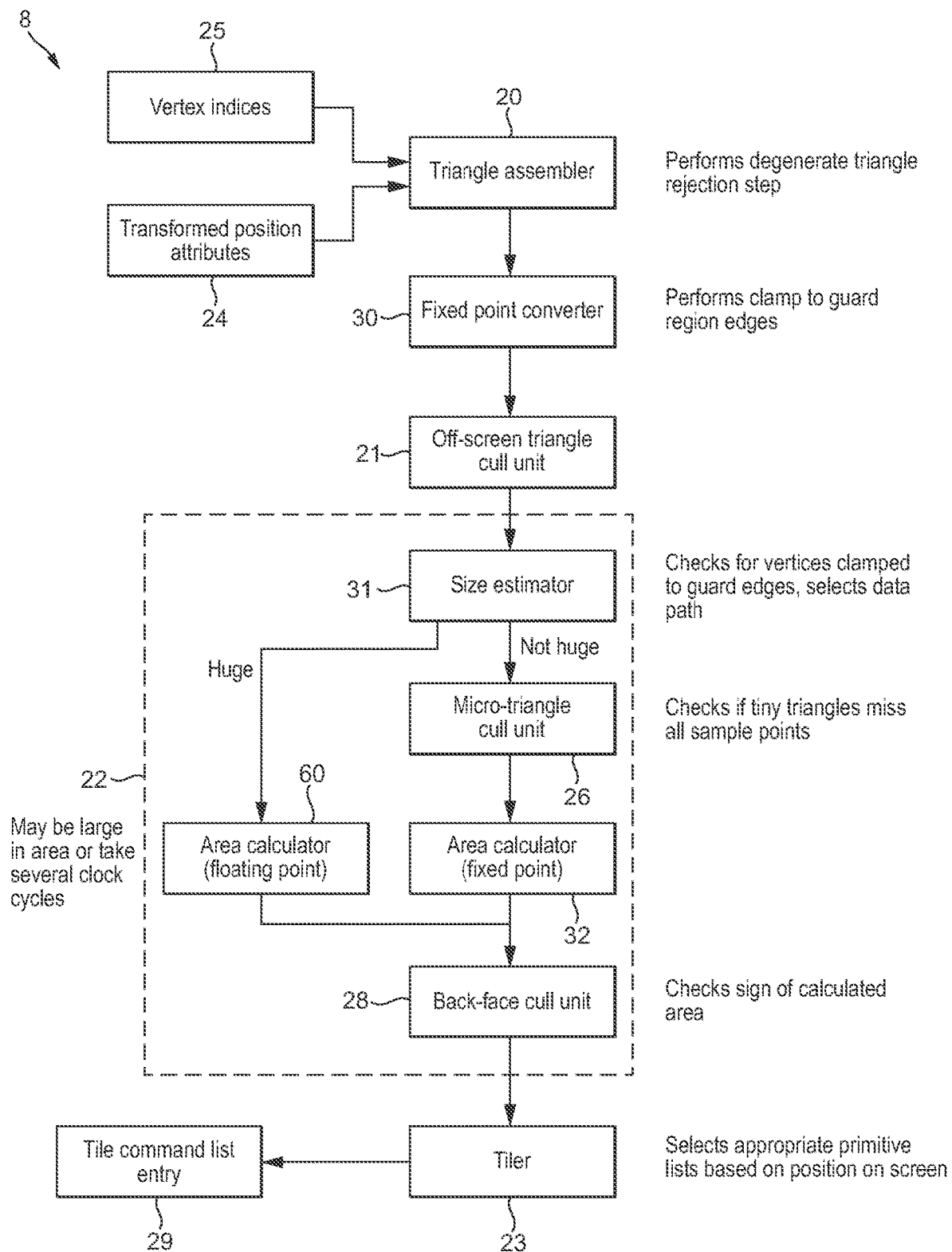
FIGS. 5 and 6 show a second embodiment of the front-end processing operation of the graphics processing pipeline of FIG. 1 that is in accordance with the technology described herein.
Figure 6:
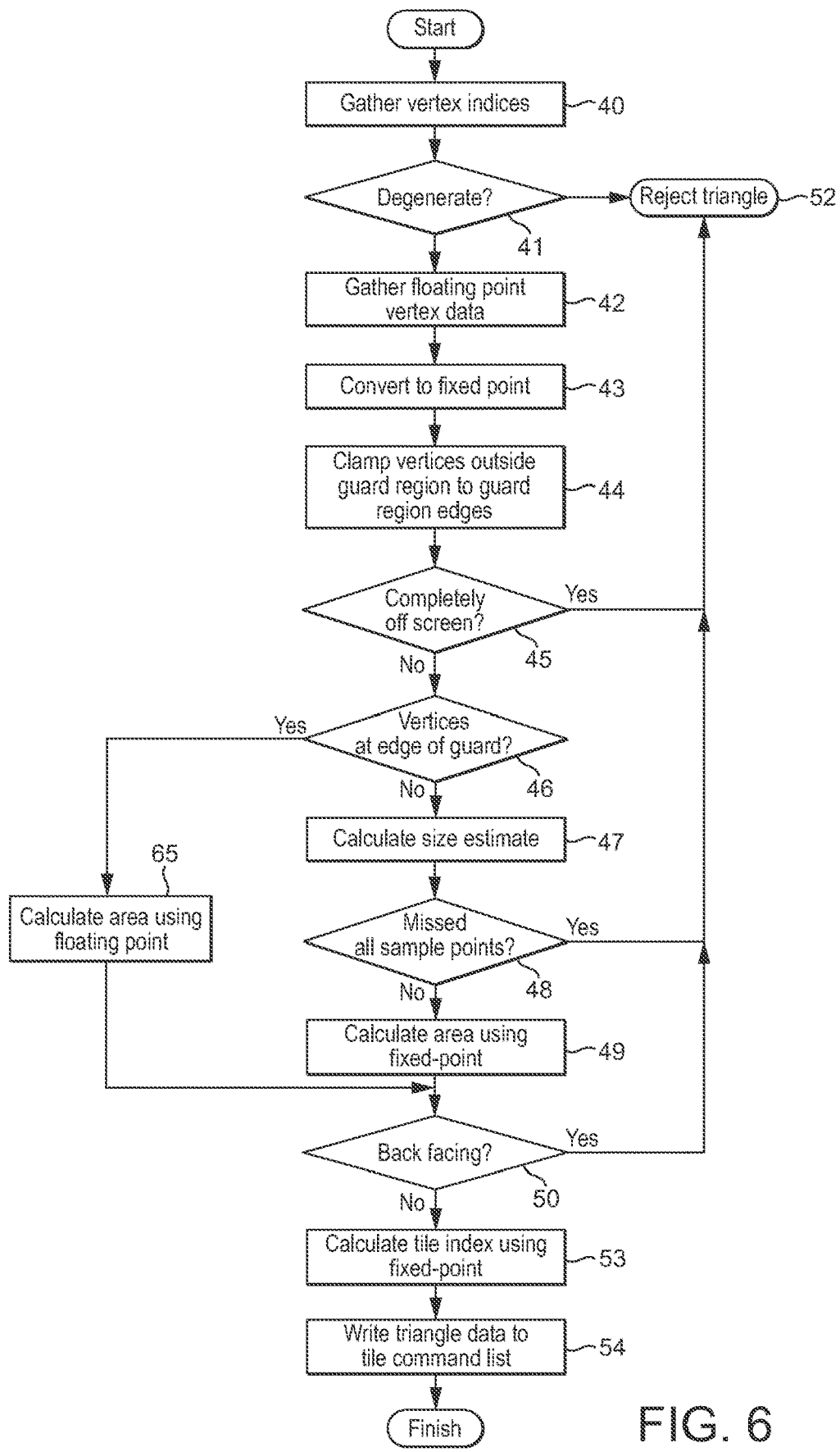

FIGS. 5 and 6 show a second embodiment of the front-end processing shown in FIG. 2 that is in accordance with the technology described herein. FIG. 5 shows the processing stages and units and FIG. 6 is a corresponding flowchart showing the front-end processing operation in this embodiment of the technology described herein.

As can be seen from FIGS. 5 and 6, in this embodiment triangles are essentially processed in the same way as the embodiment shown in FIGS. 3 and 4, except that where the size estimator 31 determines that a vertex for the triangle lie on the guard region edge (step 46 in FIG. 6) (i.e. determines that the triangle is too large to be subjected to the fixed point back-face culling operation), then rather than the triangle being sent directly to the tiler 23 (and the tiling step 53), the sign of the area of the triangle is still calculated to perform a back-face culling determination for the triangle but using floating point arithmetic and values for the vertex coordinates in a floating point area calculator 60 (FIG. 5) (at step 65 in FIG. 6).

To do this, the area calculator 60 at step 65 in FIG. 6 takes the initial floating point values for the vertices of the triangle and calculates the sign of the area of the triangle using those floating point values by taking the cross-product of the x/y coordinates of the vertices for the primitive (expressed as floating point values), modified by the signs of the w coordinates and the winding of the primitive.

The floating point area calculator 60 may, and in an embodiment does, comprise a floating point arithmetic logic unit that can perform the subtractions and multiplications necessary for the area calculation.

This then means that triangles that cannot be processed for the purpose of their facing direction determination using the fixed point area calculator 32 (step 49 in FIG. 6) can still be subjected to a back-facing culling and determination operation. However, only those triangles that are determined by the size estimator 31 as being unsuitable for processing using fixed point arithmetic and values are processed using floating point arithmetic and values in the area calculator 60 (step 65 in FIG. 6), thereby ensuring that the floating point calculations which will consume more power and may take several clock cycles are only performed for those triangles that it is determined cannot be handled using fixed point processing.

Where, as in the embodiment shown in FIGS. 5 and 6, the back-facing determination and culling unit 22 supports both fixed point and floating point processing of triangles, then the division between processing triangles using the fixed point path or the floating point path can be selected and varied as desired. For example, in the above embodiment, it is assumed that the fixed point path is used, for example, for triangles whose data values can be expressed using a 16:8 fixed point data value format (with any triangles whose data values cannot be expressed in this manner then being processed using the floating point processing path). However, it would, for example, be possible to set the fixed point path as supporting data values using fixed point 8:8 format, with any triangles whose data values cannot be expressed in that format then being processed via the floating point processing path. This will still facilitate the back-facing determination and culling unit having a smaller area and using lower power than, for example, simply processing all triangles using floating point arithmetic and data values.

Figure 7:
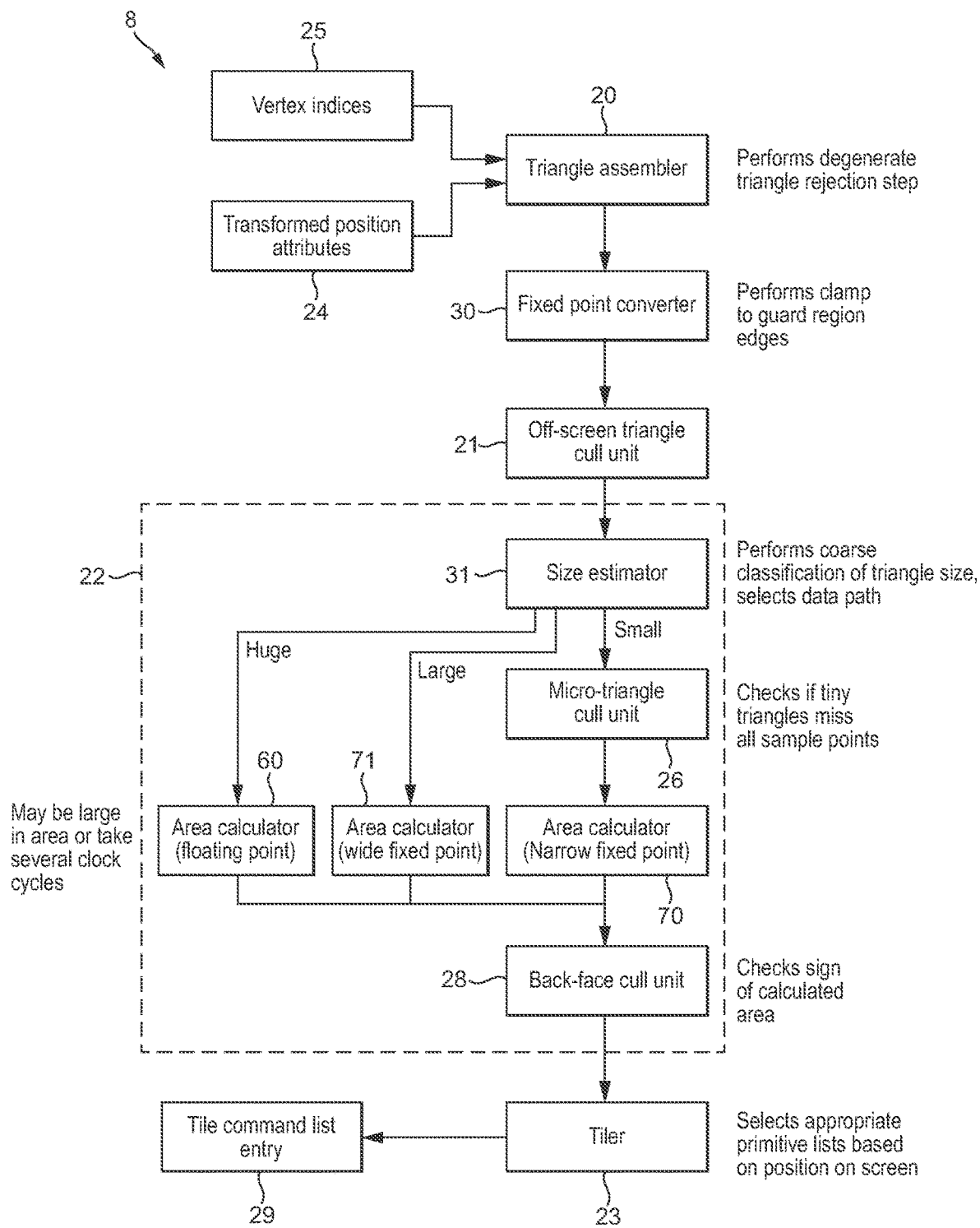
FIGS. 7 and 8 show a third embodiment of the front-end processing operation of the graphics processing pipeline of FIG. 1 that is in accordance with the technology described herein.
Figure 8:
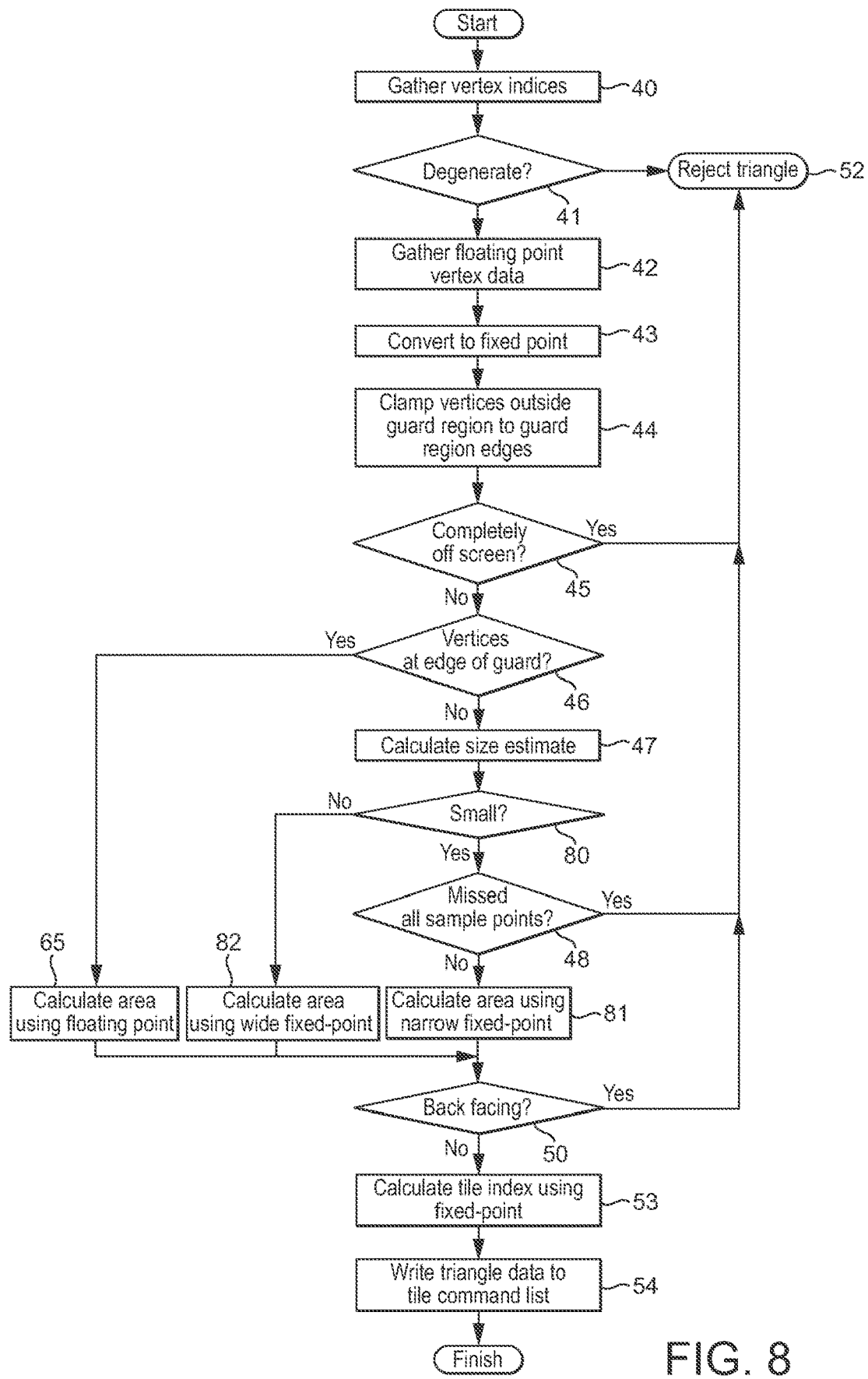

FIGS. 7 and 8 show a third embodiment of the front-end processing shown in FIG. 2 that is in accordance with the technology described herein. FIG. 7 shows the processing stages and units and FIG. 8 is a corresponding flowchart showing the front-end processing operation in this embodiment of the technology described herein.

As can be seen from FIGS. 7 and 8, in this embodiment triangles are essentially processed in the same way as the embodiment shown in FIGS. 5 and 6, except that the back-facing determination culling stage 22 supports two fixed point processing paths 70, 71 for determining the sign of the area of the primitive, namely a "narrow" fixed point area calculator 70 and a "wide" fixed point area calculator 71. The "narrow" fixed point area calculator 70 is able to perform arithmetic operations using fixed point data values up to a certain size (number of bits). The "wide" fixed point area calculator 70 is able to perform arithmetic operations using fixed point data values of a larger size (number of bits).

In this embodiment, the size estimator 31 accordingly identifies whether a given primitive is "huge" and so should have its area calculated for the purpose of the back-facing determination using the floating point area calculator 60, is "large" and so should have its area calculated for the purposes of the back-facing determination using the wide fixed point area calculator 71, or is sufficiently small such that it can have the sign of its area calculated for the purpose of the back-facing determination using the narrow fixed point area calculator 70.

(As shown in FIGS. 7 and 8, any "small" triangles that are to be processed using the narrow fixed point area calculator 70 are also subjected to the micro-triangle culling operation 26 (step 48 in FIG. 8).)

As shown in FIG. 8, the size estimator 31 determines whether a triangle to be processed is "huge" and so should have its area calculated using floating point arithmetic in the floating point area calculator 60 (step 65 in FIG. 8) by determining whether any of the vertices of the triangle lie at the edge of the guard region (step 46 in FIG. 8). It would also or instead be possible to use the absolute magnitude of the floating point coordinates for a triangle to determine if a triangle is "huge" (and so should have its area calculated using floating point arithmetic) or not, e.g. if any of the coordinates is larger than 216.

If at step 46 it is determined that none of the vertices is at the edge of the guard region (i.e. the triangle is sufficiently small to be processed using fixed point arithmetic), then a further estimate of the size of the primitive is determined at step 47. This size estimate is operable to classify the primitive into being suitable to have its area calculated using either "narrow" or "wide" fixed point values.

This can be done in any suitable manner, but in an embodiment the size estimate is calculated at step 47 by calculating the differences between respective vertex coordinate pairs, v1.x−v0.x, v2.y−v0.y, v1.y−v0.y and v2.x−v0.x (which differences as discussed above are used as part of the area calculation). The size estimator 31 determines whether the results of these subtraction operations can all be represented using the narrow fixed point format that the narrow fixed point format area calculator 70 uses, or not (step 80).

The size estimator 31 may, and in an embodiment does, comprise a fixed point arithmetic logic unit that can perform the subtractions necessary for the area estimation.

If it is determined that the results of the vertex coordinate subtractions are sufficiently small to be able to be expressed using the narrow fixed point format of the narrow fixed point area calculator 70, then as shown in FIG. 8, the triangle is then tested to determine whether it is so small as to not cover any sampling points (step 48) in the micro-triangle cull unit 26. If the triangle is not rejected by the micro-triangle cull unit 26, the remainder of the area calculation (i.e. the necessary multiplications of the results of the subtractions and the subtraction of those results) is then performed using narrow fixed point values (step 81) in the narrow fixed point area calculator 70.

On the other hand, if it is determined at step 70 that the results of the subtraction operations performed at step 47 cannot be expressed using the narrow fixed point format, then the sign of the area that the primitive is instead calculated using wide fixed point values (step 82) in the wide fixed point area calculator 71. Again, in this arrangement the wide fixed point area calculator 71 performs the necessary multiplications of the difference values generated for estimating the size at step 47 and the subtraction of those results to then provide the sign of the area.

The narrow fixed point area calculator 70 may, and in an embodiment does, comprise a fixed point arithmetic logic unit that can perform the subtractions and multiplications necessary for the (rest of the) area calculation using fixed point values of a particular format (size).

The wide fixed point area calculator 71 may, and in an embodiment does, comprise a fixed point arithmetic logic unit that can perform the subtractions and multiplications necessary for the (rest of the) area calculation using fixed point values of a larger format (size).

This then allows sufficiently small triangles to be processed using smaller (and thus more power-efficient), narrow fixed point arithmetic rather than, e.g., processing all triangles that do not need to be processed using floating point arithmetic using the same, wider fixed point arithmetic.

Where, as in the embodiments shown in FIGS. 7 and 8, the back-facing determination culling unit supports two forms of fixed point processing of triangles, then the division between processing triangles using each different fixed point path and the relative "sizes" of the different fixed point paths can be selected and varied as desired. For example, the wide fixed point path (area calculator 71) could use 16:8 format fixed point numbers, with the narrow fixed point path (area calculator 70) using 4:8 format fixed point numbers.

Triangles for which the difference values from subtracting the vertex coordinates can be expressed using the narrow fixed point format could then be processed using the narrow fixed point processing path, with other triangles being processed using the wide fixed point format processing path. Thus, for example, triangles having a maximum dimension of up to, say 16 pixels (and/or sampling positions), could be processed using the narrow fixed point processing path, with triangles having a maximum dimension between 16 and 1000 pixels (and/or sampling positions) being processed using the wide fixed point format processing path, and any triangles having a dimension larger than 1000 pixels (and/or sampling positions) being processed using the floating point processing path.

The narrow fixed point area calculator 70 and the wide fixed point area calculator 71 in this embodiment can be arranged as desired. For example, they could be completely separate arithmetic processing units, or the narrow fixed point area calculator 70 could be a subset (a subunit) of the wide fixed point area calculator 71 (i.e. such that subset of the wide fixed point area calculator unit 71 is used to perform the narrow fixed point area calculations).

A number of modifications, variations and additions to the above embodiments would be possible if desired.

For example, the magnitude of the floating point coordinates of the vertices could, as well as being used to "identify" "huge" triangles, also be used to decide how to perform any bounding box derivation for the triangle (primitive), for example whether to do the bounding box derivation using fixed point coordinates (e.g. using 24:8 fixed point coordinates) or floating point coordinates (e.g. FP32 coordinates).

It would also, e.g., be possible to, if the magnitude of the coordinates is determined to be too large for the available fixed point processing path, but to not in fact use all of the precision of the fixed point representation, then scale the coordinates (i.e. the primitive) down so as to "fit" in the fixed point processing path.

Although the present embodiments have been described above with reference to the graphics primitives that are being processed being triangles, it will be appreciated that the technology described herein could equally (and correspondingly) be used for other forms of graphics primitive, and not just triangles, if desired.

It can be seen from the above that the technology described herein, in its embodiments at least, provides a more efficient mechanism for performing back-face culling of primitives, e.g. prior to the tiling operation in a tile-based graphics processing pipeline. This is achieved in the embodiments of the technology described herein at least by classifying primitives to be processed according to their size, and then selecting a processing path for the purposes of a back-facing determination and culling operation for a primitive based on the size of the primitive.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing pipeline which processes graphics primitives, the method comprising:
when the graphics processing pipeline is processing a plurality of graphics primitives to generate a render output, each primitive being defined by a set of vertices, the vertices having respective coordinates, and the set of vertices of each primitive defining an area of the primitive, wherein the area of each primitive has a sign that is positive or negative:
culling graphics primitives of the plurality of graphics primitives being processed by the graphics processing pipeline, by:
for each primitive of the plurality of primitives:
determining a difference between coordinates of vertices of the primitive;
determining a size of the primitive using the determined difference between coordinates of vertices of the primitive; and
determining whether the determined size of the primitive meets a particular size condition; and
for at least one primitive meeting the particular size condition:
determining the sign of the area of the primitive using the set of vertices of the primitive; and
when the sign of the area of the primitive is determined to be positive, determining that a facing direction of the primitive is a first direction; but
when the sign of the area of the primitive is determined to be negative, determining that the facing direction of the primitive is a second direction different from the first direction;
culling from further processing those primitives that the facing direction of is determined to match any of one or more culling facing directions; and
processing to generate the render output any primitive of the plurality of primitives that the facing direction of is not determined to match any of the one or more culling facing directions.

2. The method of claim 1, wherein:
the condition that the size of the primitive has to meet for the facing direction of the primitive to then be determined using the particular processing operation is that the size of the primitive is less than, or less than or equal to, a threshold size measure.

3. The method of claim 1, wherein:
the primitive is a triangle having three vertices v0, v1 and v2, each having respective x and y coordinates, and the sign of the area of the triangle is determined as:

Area=((v1.x−v0.x)(v2.y−v0.y)−
(v1.y−v0.y)(v2.x−v0.x)).

4. The method of claim 1, wherein:
the particular processing operation that is used to determine the facing direction of the primitive when the size of the primitive meets the particular size condition comprises determining the facing direction of the primitive using one or more of: fixed point arithmetic; arithmetic operations with reduced range; and arithmetic operations with reduced precision.

5. The method of claim 1, comprising, for each primitive not meeting the particular size condition:
not determining the facing direction of the primitive; or determining the facing direction of the primitive using floating point arithmetic.

6. The method of claim 1, comprising:
when the size of a primitive meets a first particular condition, determining the facing direction of the primitive using a first processing operation;
when the size of a primitive meets a second particular condition, determining the facing direction of the primitive using a second processing operation; and
when the size of a primitive meets a third particular condition, either determining the facing direction of the primitive using a third processing operation, or not determining the facing direction of the primitive.

7. The method of claim 1, wherein:
the graphics processing pipeline is a tile-based graphics processing pipeline, and the facing direction determination and culling is performed before the tiling stage of the graphics processing pipeline operations.

8. The method of claim 1, further comprising:
performing another primitive culling test and culling operation on each primitive of the plurality of primitives; and
only determining the facing direction of a primitive using the particular processing operation when the size of the primitive meets the particular size condition, and the primitive passes the another primitive culling test and culling operation.

9. A graphics processing pipeline which processes graphic primitives to generate a render output, each primitive being defined by a set of vertices, the vertices having respective coordinates and the set of vertices of each primitive defining an area of the primitive, wherein the area of each primitive has a sign that is positive or negative, the pipeline comprising:
testing circuitry configured to:
determine a difference between coordinates of vertices of a primitive;
determine a size of the primitive using the determined difference between coordinates of vertices of the primitive; and
determine whether the determined size of the primitive meets a particular size condition;
facing direction determination circuitry configured to, for a primitive meeting the particular size condition:
determine the sign of the area of the primitive using the set of vertices of the primitive; and
when the sign of the area of the primitive is determined to be positive, determine that a facing direction of the primitive is a first direction; but
when the sign of the area of the primitive is determined to be negative, determine that the facing direction of the primitive is a second direction different from the first direction;
facing direction culling circuitry configured to cull from further processing any primitive that the facing direction of is determined to match any of one or more culling facing directions; and
processing circuitry configured to process any primitive that the facing direction of is not determined to match any of the one or more culling facing directions to generate a render output.

10. The pipeline of claim 9, wherein:
the condition that the size of the primitive has to meet for the facing direction of the primitive to then be determined using the particular processing operation is that the size of the primitive is less than, or less than or equal to, a threshold size measure.

11. The pipeline of claim 9, wherein:
the primitive is a triangle having three vertices v0, v1 and v2, each having respective x and y coordinates, and the sign of the area of the triangle is determined as:

$$\text{Area} = ((v1.x - v0.x)(v2.y - v0.y) - (v1.y - v0.y)(v2.x - v0.x)).$$

12. The pipeline of claim 9, wherein:
the particular processing operation that is used to determine the facing direction of the primitive when the size of the primitive meets the particular size condition comprises determining the facing direction of the primitive using one or more of: fixed point arithmetic; arithmetic operations with reduced range; and arithmetic operations with reduced precision.

13. The pipeline of claim 9, wherein:
the testing circuitry is further configured to, in response to determining that the size of a primitive does not meet the particular size condition:
cause the processing of the primitive to bypass the facing direction determination circuitry; or
cause the facing direction determination circuitry to determine the facing direction of the primitive using floating point arithmetic.

14. The pipeline of claim 9, wherein:
the facing direction determination circuitry is configured to determine the facing direction of the primitive using at least two different processing operations; and
the testing circuitry is configured to cause a primitive to be processed by the facing direction determination circuitry of the pipeline using one of the processing operations based on whether the size of the primitive meets a particular size condition or not.

15. The pipeline of claim 9, further comprising:
tiling circuitry configured to sort primitives to be processed into respective lists corresponding to particular regions of a graphics processing output to be generated; and wherein:
the testing circuitry, facing direction determination circuitry and facing direction culling circuitry are all configured to operate before the tiling circuitry of the graphics processing pipeline.

16. The pipeline of claim 9, further comprising:
one or more additional primitive culling circuitry that is configured to operate before the facing direction determination circuitry and facing direction culling circuitry of the graphics processing pipeline.

17. A non-transitory computer readable storage medium storing computer software code which when executing on at least one processor performs a method of operating a graphics processing pipeline which processes graphics primitives, the method comprising:
when the graphics processing pipeline is processing a plurality of graphics primitives to generate a render output, each primitive being defined by a set of vertices, the vertices having respective coordinates, and the set of vertices of each primitive defining an area of the primitive, wherein the area of each primitive has a sign that is positive or negative:
culling graphics primitives of the plurality of graphics primitives being processed by the graphics processing pipeline, by:
for each primitive of the plurality of primitives:
determining a difference between coordinates of vertices of the primitive;

determining a size of the primitive using the determined difference between coordinates of vertices of the primitive; and determining whether the determined size of the primitive meets a particular size condition; and for each primitive meeting the particular size condition:

determining the sign of the area of the primitive using the set of vertices of the primitive; and when the sign of the area of the primitive is determined to be positive, determining that a facing direction of the primitive is a first direction; but when the sign of the area of the primitive is determined to be negative, determining that the facing direction of the primitive is a second direction different from the first direction;

culling from further processing those primitives that the facing direction of is determined to match any of one or more culling facing directions; and processing to generate the render output any primitive of the plurality of primitives that the facing direction of is not determined to match any of the one or more culling facing directions.

* * * * *